(12) United States Patent
Schwartz et al.

(10) Patent No.: US 7,978,334 B2
(45) Date of Patent: Jul. 12, 2011

(54) MATTER-WAVE RATE GYRO INTEGRATED ONTO AN ATOM CHIP AND ASSOCIATED ACCELEROMETER

(75) Inventors: Sylvain Schwartz, Saint-Remy les Chevreuse (FR); Jean-Paul Pocholle, La Norville (FR)

(73) Assignee: Thales, Neuilly sur Seine (FR)

( * ) Notice: Subject to any disclaimer, the term of this patent is extended or adjusted under 35 U.S.C. 154(b) by 340 days.

(21) Appl. No.: 12/360,803

(22) Filed: Jan. 27, 2009

(65) Prior Publication Data

US 2010/0177317 A1    Jul. 15, 2010

(30) Foreign Application Priority Data

Dec. 16, 2008  (FR) ..................... 08 07073

(51) Int. Cl.
*G01C 19/72* (2006.01)
(52) U.S. Cl. ....................................... 356/460
(58) Field of Classification Search ................... 356/460
See application file for complete search history.

(56) References Cited

U.S. PATENT DOCUMENTS

| | | | | |
|---|---|---|---|---|
| 5,274,231 | A * | 12/1993 | Chu et al. | 250/251 |
| 5,274,232 | A * | 12/1993 | Chu et al. | 250/251 |
| 6,303,928 | B1 * | 10/2001 | Buell et al. | 250/251 |
| 6,314,809 | B1 * | 11/2001 | Kasevich et al. | 73/382 R |
| 7,030,370 | B1 * | 4/2006 | Crookston et al. | 250/251 |
| 2009/0289629 | A1 * | 11/2009 | Tuchman | 324/304 |
| 2010/0147071 | A1 * | 6/2010 | Schwartz et al. | 73/382 R |
| 2010/0177317 | A1 * | 7/2010 | Schwartz et al. | 356/460 |

OTHER PUBLICATIONS

Zatezalo et al, "Bose-Einstein Interferometery and its Applicaitons to Precision Undersea Navigation" IEEE, 2008, pp. 940-950.*
Wang et al., "Atom Michelson Interferometer on a Chip Using a Bose-Einstein Condensate", Phyiscal Review Letters, 2005 94, 090405, pp. 1-4.*
Ron Folman, et al., "Microscopic atom optics: from wires to an atom chip", Adv. in At. Mol. Opt. Physics, 2008, pp. 1-47.
T.L. Gustavson, et al., "Precision Rotation Measurements with an Atom Interferometer Gyroscope", Physical Review Letters, Mar. 17, 1997, pp. 2046-2049, vol. 78, No. 11.

(Continued)

*Primary Examiner* — Patrick J Connolly
(74) *Attorney, Agent, or Firm* — LaRiviere, Grubman & Payne, LLP

(57) ABSTRACT

The general field of the invention is that of rate gyros, of the matter-wave type, allowing the measurement of a speed of rotation in a given direction of measurement. This type of rate gyro works by the Sagnac effect and uses ultracold atoms to perform the measurement. It necessarily comprises an atom trap allowing a cloud of ultracold atoms to be immobilized in a given configuration and means for separation-displacement-recombination of the cloud into two packets of atoms so as to make them trace out a given area. The device according to the invention combines both of these two functions onto one atom chip notably comprising a first conducting wire through which a DC current $I_{DC}$ flows with adjustable intensity, a second conducting wire and a third conducting wire that are substantially parallel, within the region of the trap, to the first conducting wire and are disposed symmetrically on either side of this first wire, the second and the third wire carrying an AC current of the same amplitude and same frequency flowing in the same direction, the maximum amplitude and the frequency of said current being sufficient to create, within the atom cloud, a magnetic field of higher intensity than the magnetic intensity required for the separation of the atom cloud into two packets of atoms.

8 Claims, 7 Drawing Sheets

OTHER PUBLICATIONS

I. Lesanovsky, et al., "Adiabatic radio frequency potentials for the coherent manipulation of matter waves", Jan. 2006, pp. 1-13.

O. Zobay, et al., "Two-Dimensional Atom Trapping in Field-Induced Adiabatic Potentials", Physical Review Letters, Feb. 12, 2001, pp. 1195-1198, vol. 86, No. 7.

Shengwang Du, et al., "Atom-chip Bose-Einstein condensation in a portable vacuum cell", Physical Review A, 2004, pp. 1-4.

T. Schumm, et al., "Matter-wave interferometry in a double well on an atom chip", Nature Physics, Oct. 2005, pp. 57-62, vol. 1.

D.S. Durfee, et al., "Long-Term Stability of an Area-Reversible Atom-Interferometer Sagnac Gyroscope", Physical Review Letters, Dec. 15, 2006, pp. 1-4.

* cited by examiner

MATTER-WAVE RATE GYRO INTEGRATED ONTO AN ATOM CHIP AND ASSOCIATED ACCELEROMETER

PRIORITY CLAIM

This application claims priority to French Patent Application Number 08 07073, entitled Matter-Wave Rate Gyro Integrated onto an Atom Chip and Associated Accelerometer, filed on Dec. 16, 2008.

BACKGROUND OF THE INVENTION

1. Field of the Invention

The general field of the invention is that of gyrometry, in other words the field of the measurement of rotation speeds. More precisely, the technical field of the invention is that of matter-wave rate gyros. In these gyros, the measurement of the speed relies on the measurement of the phase shift $\Delta\phi$ induced by the Sagnac effect between two counter-rotating matter waves in a reference frame rotating at the angular velocity $\dot\theta$, $\Delta\phi$ being given by:

$$\Delta\varphi = \frac{4Am}{\hbar}\dot\theta,$$

where A is the area contained by the interferometer, in the mass of the atoms and $h=2\pi\hbar$ is Planck's constant. The exploitation of the atom Sagnac effect described hereinabove represents a technological breakthrough in the field of rate gyroscopes, which conventionally use the optical Sagnac effect, since the ratio between the atomic and optical Sagnac phase-shifts is given, all other things being equal, by the quantity $mc^2/(hv)$ and is of the order of $10^{10}$ or $10^{11}$ depending on the type of atom and the optical frequency $v$ in question.

2. Description of the Prior Art

The best rate gyros currently commercially available are based on the optical Sagnac effect, which takes place either in an active laser cavity or in a passive fiber interferometer. In the first case, the products are known as gyrolasers and, in the second, fiber-optic rate gyros. The replacement of the optical waves by matter waves leads to a huge gain in sensitivity, even if the latter is, in part, counterbalanced by the reduction in the signal-to-noise ratio and in the area of the interferometer. Matter-wave rate gyros have been an experimental reality since 1997, the date of the first measurement of the Earth's rotation with this type of device. Reference will be made to the article by T. Gustayson et al., Phys. Rev. Lett. 78 (1997) on this point. Today, several laboratories have constructed similar sensors, and the performances attained already surpass those of the best optical rate gyros (see D. Durfee et al., Phys. Rev. Lett. 97, 240801 (2006)). For future developments, the potential for improvement is still several orders of magnitude.

Atom rate gyros rely on the use of matter waves. According to the laws of quantum mechanics, the latter are associated with any particle that has mass. The technique of atom interferometry allows phase differences between packets of matter waves to be measured. It requires, in particular, the prior cooling of the atoms to temperatures close to absolute zero, in order to limit their thermal velocity dispersion. In the following part of the text, these cooled atoms will be called cold or ultracold atoms.

Significant efforts have been deployed in recent years in order to integrate part of the functions for trapping, cooling and manipulating cold atoms onto devices of the "chip" type, the latter having the advantage of compactness, but also of a very good control of the magnetic fields necessary for the system and of a relatively low electrical power consumption. In addition, the advantage of using and of incorporating radiofrequency fields for the coherent manipulation of the atoms, underlined in 2000 in an article by O. Zobay and B. Garraway, Two-Dimensional Atom Trapping in Field-Induced Adiabatic Potentials, Physical Review Letters 86, pages 1195-1198 (2001), has recently been experimentally demonstrated by the coherent separation into two equal parts of a Bose-Einstein condensate in 2006, which constitutes the atom equivalent of a separator plate for a laser, a key component for the construction of atom interferometers. For further information, reference will be made to the publication by T. Schumm et al., Matter-wave interferometry in a double well on an atom chip, Nature Physics 1, pages 57-62 (2005).

SUMMARY OF THE INVENTION

Based on the existing technologies in the framework of atom gyrometry and of coherent manipulation of matter waves on atom chips, the rate gyro according to the invention provides an original sensor architecture for the measurement of local speeds of rotation or of accelerations to which the device is subjected.

More precisely, the first subject of the invention is a rate gyro, of the matter-wave type, allowing the measurement of the speed of rotation along a given measurement axis, said rate gyro comprising at least:

an electronic chip comprising a measurement plane;

means for generating, capturing and cooling a cloud of ultracold atoms and an atom trap allowing the cloud of ultracold atoms to be immobilized at a predetermined distance from said measurement plane;

the trap comprising an assembly of conducting wires and external windings allowing a magnetic field local minimum to be produced; such a trap can for example consist, on the one hand, of a first conducting wire integrated into said chip through which a DC current $I_{DC}$ flows and, on the other hand, means for generating a uniform magnetic field whose field lines are parallel to the measurement plane and perpendicular to the direction of the first conducting wire within the region of the trap;

means for separating the atom cloud into two packets of atoms, means for displacing said packets, said means also allowing the two packets to be recombined into a single atom cloud, the whole of the two packets having traveled around a first closed area between the separation and recombination;

means for optical measurement of the phase-shift introduced into the atom cloud after recombination;

electronic means for monitoring, controlling and feedback control of the various means of the rate gyro;

the separation and displacement means essentially comprising the first main conducting wire, a second conducting wire and a third conducting wire substantially parallel to one another within the region of the trap, the second conducting wire and the third conducting wire being disposed symmetrically on either side of the first wire, the second wire and the third wire carrying AC currents with the same amplitude and frequency flowing in the same direction, the maximum amplitude and the frequency of said currents being sufficient to create, within the atom cloud, an AC magnetic field with a higher intensity than the magnetic intensity required for the separation of the atom cloud into two packets of atoms along the direction of polarization of said magnetic field, the amplitude of the DC current $I_{DC}$ flowing in the first wire being able to be modified in the course of the measurement.

Advantageously, the rate gyro comprises at least a second atom trap identical to the first atom trap, disposed above a second region of the measurement plane of the electronic chip and a fourth, a fifth and a sixth conducting wire having respective functions similar to those of the first, second and third conducting wires and arranged in such a manner as to separate a second atom cloud into two packets of atoms, to displace said packets and to recombine them into a single atom cloud, the whole of the two packets having traveled around a second closed area between the separation and recombination, the second area having either a direction of travel or geometrical properties different from the first area, the rate gyro also comprising means for optical measurement of the second phase-shift introduced into the second atom cloud after recombination, the electronic means comprising functions allowing at least the sum and the difference of the first and of the second phase-shifts to be performed.

A second subject of the invention is a sensor, of the matter-wave type, for measuring the speed of rotation and the acceleration along a given axis and direction, said sensor comprising at least:

an electronic chip comprising a measurement plane;

means for generating, capturing and cooling at least a first and a second cloud of ultracold atoms;

a first atom trap allowing the first cloud of ultracold atoms to be immobilized at a first predetermined distance from said measurement plane, a second atom trap allowing the second cloud of ultracold atoms to be immobilized at a second predetermined distance from said measurement plane;

the first trap comprising a first conducting wire integrated into said chip through which a first DC current $I_{DC}^A$ flows, the second trap comprising a fourth conducting wire integrated into said chip through which a current $I_{DC}^B$ flows, the first and the second trap comprising means for generating a uniform magnetic field whose field lines are parallel to the measurement plane and perpendicular to the direction of the first and of the fourth conducting wire;

first means for separating the first atom cloud into two packets of atoms, first means for displacing said packets, said means also allowing the two packets to be recombined into a single atom cloud, the whole of the two packets having traveled around a first closed area between the separation and recombination;

second means for separating the second atom cloud into two packets of atoms, second means for displacing said packets, said means also allowing the two packets to be recombined into a single atom cloud, the whole of the two packets having traveled around a second closed area between the separation and recombination;

means for optical measurement of the first and of the second phase-shift introduced into the first and the second atom cloud after recombination;

electronic means for monitoring, controlling and feedback control of the various means of the sensor;

the first and second separation and displacement means essentially comprising the first and the fourth conducting wires, a second, a third and a fifth conducting wire substantially parallel to one another within the region of the trap, the second and the third conducting wires being disposed symmetrically on either side of the first wire, the third and the fifth conducting wire being disposed symmetrically on either side of the fourth wire; the second wire, the third wire and the fifth wire carrying AC currents with the same amplitude and frequency flowing in the same direction, the maximum amplitude and the frequency of said currents being sufficient to create, within the two atom clouds, an AC magnetic field with a higher intensity than the magnetic intensity required for the separation of the atom cloud into two packets of atoms in the polarization direction of said field, the amplitudes of the DC currents $I_{DC}^A$ and $I_{DC}^B$ being able to be modified in the course of the measurement, the rate gyro comprising means for optical measurement of the first and second phase-shifts introduced into the first and the second atom clouds after recombination, the electronic means comprising functions allowing at least the sum and the difference of the first and the second phase-shifts to be performed.

Advantageously, the direction of travel around the first area by the packets of atoms coming from the first cloud is opposite to that around the second area by the packets of atoms coming from the second cloud.

Preferably, the means for cooling the cloud of ultracold atoms and the atom trap are designed in such a manner that the cloud or clouds of atoms are Bose-Einstein condensates.

The invention also relates to the methods for implementing the preceding sensor. Thus, a third subject of the invention is a first method for measuring a speed of rotation about a given axis by means of a rate gyro, of the matter-wave type, said rate gyro comprising at least:

an electronic chip comprising a measurement plane;

means for generating, capturing and cooling a cloud of ultracold atoms and an atom trap allowing the cloud of ultracold atoms to be immobilized at a predetermined distance from said predetermined measurement plane;

the trap comprising at least, on the one hand, a first conducting wire integrated into said chip through which a DC current $I_{DC}$ flows and, on the other hand, means for generating a uniform magnetic field whose field lines, within the region of the trap, are parallel to the measurement plane and perpendicular to the direction of the first conducting wire;

means for separating the atom cloud into two packets of atoms, means for displacing said packets and for recombining the two packets into a single atom cloud, the separation and displacement means essentially comprising the first conducting wire, a second conducting wire and a third conducting wire substantially parallel to one another within the region of the trap, the second conducting wire and the third conducting wire being disposed symmetrically on either side of the first wire, the second wire and the third wire carrying AC currents with the same amplitude and frequency flowing in the same direction, the maximum amplitude and the frequency of said currents being sufficient to create, within the atom cloud, an AC magnetic field with a higher intensity than the magnetic intensity required for the separation of the atom cloud into two packets of atoms along the direction of polarization of said magnetic field, the amplitude of the DC current $I_{DC}$ flowing in the first wire being variable;

means for optical measurement of the phase-shift introduced into the atom cloud after recombination;

electronic means for monitoring, controlling and feedback control of the various means of the rate gyro;

the performance of a measurement comprising the following phases:

Phase 1, called generation phase: Generation, cooling and trapping of a cloud of ultracold atoms at a first predetermined distance from said measurement plane, the DC current $I_{DC}^A$ having a first amplitude $I_{DC}^I$;

Phase 2, called separation phase: Progressive and simultaneous increase of the AC currents until the amplitude and the frequency of said currents are sufficiently high to create, within the atom cloud, a magnetic field with an intensity higher than the magnetic intensity required for the separation of the atom cloud into two packets along the axis of polarization of said magnetic field, the two packets being separated by a given distance along said axis;

Phase 3, called displacement phase: Progressive variation of the amplitude of the DC current $I_{DC}^A$ up to a second amplitude $I_{DC}^2$, the first distance of the packets of atoms varying up to a second predetermined distance from said measurement plane;

Phase 4, called recombination phase: Lowering of the amplitude of the AC currents so as to regroup the two packets of atoms into a single phase-shifted atom cloud, the whole of the two packets having traveled around a first closed area between the separation and recombination;

Phase 5, called measurement phase: Measurement of the phase-shift by the optical measurement means.

A fourth subject of the invention is a second method for measuring the speed of rotation and the acceleration along a given axis and direction by means of a sensor, of the matter-wave type, said sensor comprising at least:

an electronic chip comprising a measurement plane;

means for generating, capturing and cooling at least a first and a second cloud of ultracold atoms;

a first atom trap allowing the first cloud of ultracold atoms to be immobilized at a first predetermined distance from said measurement plane, a second atom trap allowing the second cloud of ultracold atoms to be immobilized at a second predetermined distance from said measurement plane;

the first trap comprising a first conducting wire integrated into said chip through which a first DC current $I_{DC}^A$ flows, the second trap comprising a fourth conducting wire integrated into said chip through which a current $I_{DC}^B$ flows, the first and the second trap comprising means for generating a uniform magnetic field whose field lines are parallel to the measurement plane and perpendicular to the direction of the first and of the fourth conducting wire;

first means and second means for separation of the first and of the second atom cloud into two times two packets of atoms, first and second means for displacing said packets, said means also allowing the four packets to be recombined into two atom clouds, all of the two times two packets having traveled around a first closed area between the separation and recombination and a second closed area between the separation and recombination, the first and second separation and displacement means essentially comprising the first and the fourth conducting wire, a second, a third and a fifth conducting wire substantially parallel to one another within the region of the trap, the second and the third conducting wires being disposed symmetrically on either side of the first wire, the third and the fifth conducting wires being disposed symmetrically on either side of the fourth wire; the second wire, the third wire and the fifth wire carrying AC currents with the same amplitude and frequency flowing in the same direction, the maximum amplitude and the frequency of said currents being sufficient to create, within the two atom clouds, an AC magnetic field with a higher intensity than the magnetic intensity required for the separation of the two atom clouds into two times two packets of atoms in the direction of polarization of said magnetic field, the amplitudes of the currents $I_{DC}^A$ and $I_{DC}^B$ being able to be varied in the course of the measurement, the rate gyro comprising means for optical measurement of the first and second phase-shifts introduced into the first and the second atom clouds after recombination, means for optical measurement of the first and of the second phase-shift introduced into the first and the second atom cloud after recombination;

electronic means for monitoring, controlling and feedback control of the various means of the sensor, comprising functions allowing at least the sum and the difference of the first and of the second phase-shifts to be performed;

the performance of a measurement comprising the following phases:

Phase 1, called generation phase: Generation, cooling and trapping of a cloud of ultracold atoms at a first predetermined distance from said measurement plane, the first DC current $I_{DC}^A$ having a first amplitude $I_{DC}^1$; generation, cooling and trapping of a second cloud of ultracold atoms at a second predetermined distance from said measurement plane, the second DC current $I_{DC}^B$ having a first amplitude $I_{DC}^2$;

Phase 2, called separation phase: Progressive and simultaneous increase of the AC currents until the amplitude and the frequency of said currents are sufficiently high to create within the two atom clouds a magnetic field with an intensity higher than the magnetic intensity required for the separation of the two atom clouds into two times two packets, each set of two packets being separated by the same given distance in a direction parallel to the measurement plane;

Phase 3, called displacement phase: Progressive variation of the amplitude of the first DC current $I_{DC}^A$ up to the second amplitude $I_{DC}^2$, the first distance of the packets of atoms coming from the first cloud varying up to the second predetermined distance to said measurement plane, and progressive variation of the amplitude of the second DC current $I_{DC}^B$ up to the first amplitude $I_{DC}^1$, the second distance of the packets of atoms coming from the second cloud varying up to the first predetermined distance to said measurement plane;

Phase 4, called recombination phase: Lowering of the amplitude of the AC currents so as to regroup the two times two packets of atoms into two phase-shifted atom clouds, all of the packets having traveled around a first closed area and a second closed area between the separation and recombination;

Phase 5, called measurement phase: Measurement of the two phase-shifts obtained on the first cloud and the second cloud by the optical measurement means; calculation of the sum and the difference of the first and of the second phase-shift.

BRIEF DESCRIPTION OF THE DRAWINGS

The invention will be better understood and other advantages will become apparent upon reading the description that follows, presented by way of non-limiting illustration and with reference to the appended figures, among which.

MORE DETAILED DESCRIPTION

Figure 1:
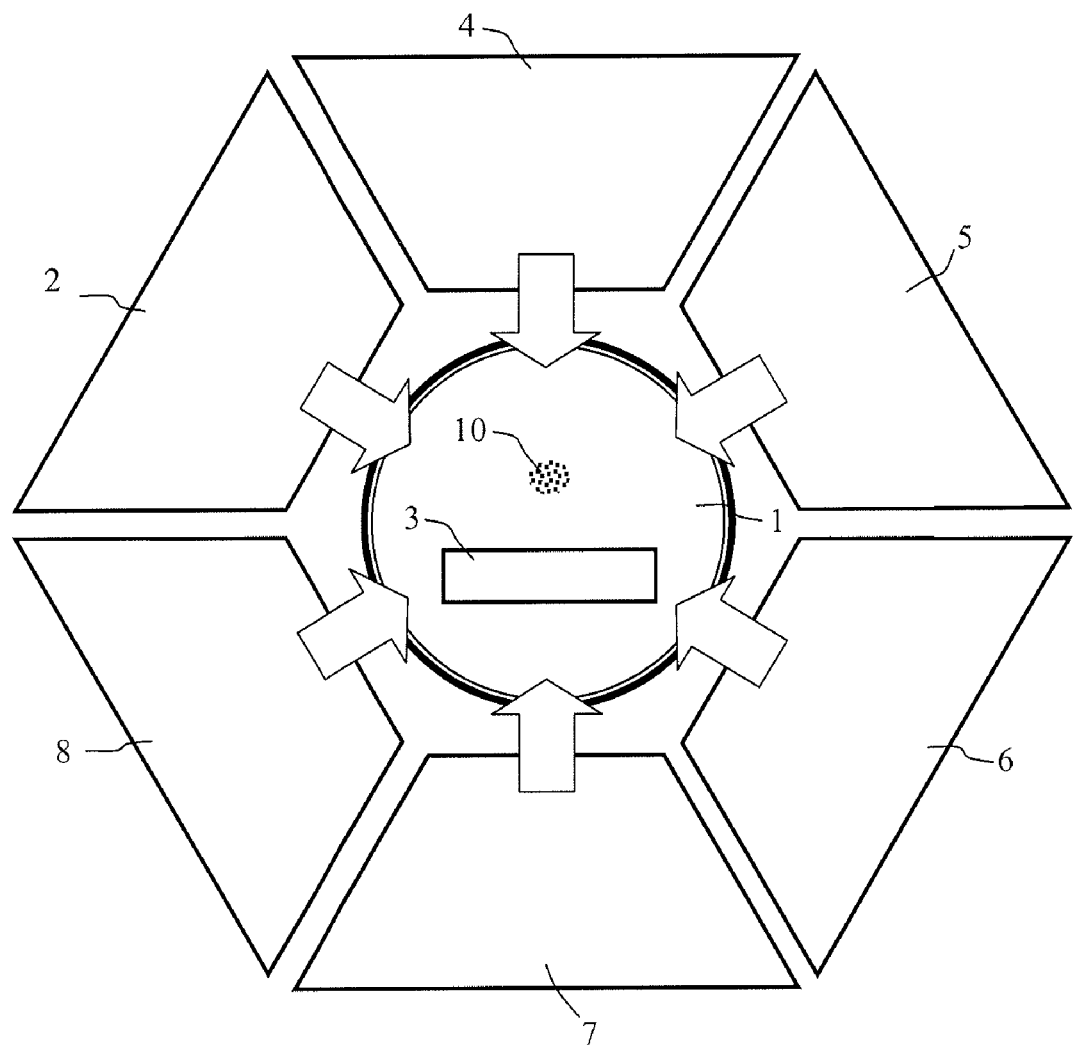
FIG. 1 shows the general technical principle of a rate gyro or of an accelerometer using matter waves.

FIG. 1 shows the main technical components of a matter-wave rate gyro or sensor according to the invention, the essential difference between the rate gyro and the sensor being that while the rate gyro must comprise at least one cloud of ultra-cold atoms, the sensor has to comprise at least two. The device comprises a vacuum chamber 1 kept evacuated, for example, by means of an ion pump and comprising a magnetic shield and an atom generator 2, better known by the term "atom dispenser". This dispenser is, for example, a heated filament delivering a rubidium vapor. The device also comprises an atom chip 3 and possibly external magnetic field sources, a first optical assembly 4 allowing the capture and the pre-cooling of the atoms 10 before they enter the magnetic trap 5, together with a second optical detection assembly 6 at the end of the sequence which can, for example, be provided by a camera of the CCD type. The device also comprises means for separation 7 of the atom cloud. An electronic device 8 is also required to provide the control of the various elements and the time synchronization of the various steps of the measurement going from the capture to the detection of the atoms. The publication by S. Du et al., Atom-chip Bose-Einstein condensation in a portable vacuum cell, Physical Review A 70, 053606 (2004) is a good example of integration of this type of device into a compact volume.

Figure 2A:
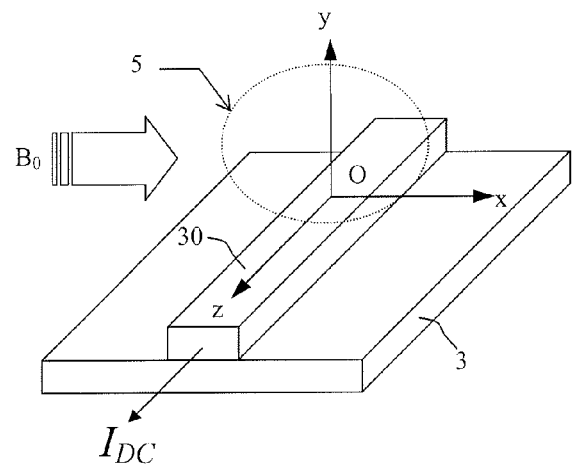
FIGS. 2a and 2b show a possible principle for generating a magnetic field local minimum at the surface of a chip.
Figure 2B:
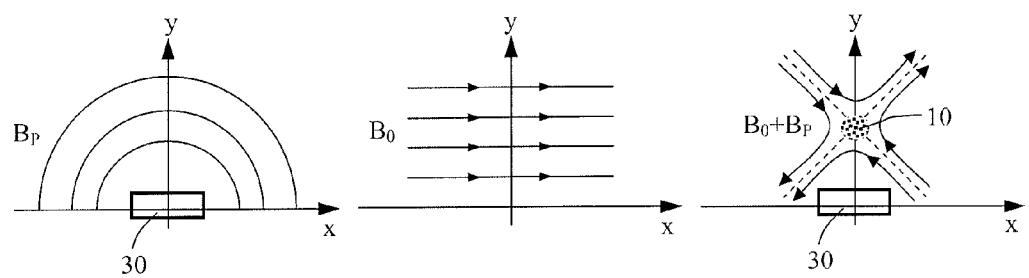

In the device according to the invention, the trapping of the atoms is achieved using magnetic traps 5 whose principle, familiar to those skilled in the art, is shown schematically in FIGS. 2a and 2b. The cloud of cold atoms is trapped by a magnetic field minimum created at the surface of a chip 3 by an assembly of wires 30 printed onto the latter, which could be combined with external magnetic field sources. The trapping of the atoms 10 relies on the interaction between the magnetic field and the total magnetic dipole of the atoms, which are attracted or repelled, depending on their internal state, by the field extrema. In the example in FIG. 2, the field minimum is created by the combination of the magnetic fields $B_P$ generated by the conducting wires 30 on the chip 5 and a constant or bias magnetic field $B_0$ generated by external coils not shown in FIG. 2. FIG. 2a shows a perspective view of one part of the chip 3 and of the conducting wire 30 together with the Cartesian reference frame (0, x, y, z) which is used for the following figures. The measurement direction is parallel to the axis Oy. FIG. 2b shows, on the left, the semi-circular magnetic field lines created by a conducting wire 30 through which a current $I_{DC}$ flows, in the center the rectilinear field lines due to the "magnetic bias" and, on the right, the superposition of the magnetic fields which create the magnetic trap above the conducting wire 30. To a first approximation, the field lines then take the shape of a capital X in the cross-sectional plane (O, x, y), as indicated in FIG. 2b, the atoms being trapped in the center of the X. Such a trap could be anisotropic, for example strongly confining in two directions of space and more weakly confining in the third. The detailed description of all of the elements allowing such a source of cold atoms to be obtained at the surface of a chip is presented in the literature. Reference may, for example, be made to the publication by R. Folman et al., Microscopic atom optics: from wires to an atom chip, Advances in Atomic, Molecular, and Optical Physics 48, pages 263-356 (2002).

It is known, according to the aforementioned references, that it is possible, using such an arrangement, for a group of cold atoms to be obtained within a magnetic trap at a distance $h_0$ from the chip approximately given by:

$$h_0 \approx \frac{\mu_0 I_{DC}}{2\pi B_0}, \tag{A}$$

where $\mu_0$ is the magnetic permeability of free space. The typical order of magnitude for the distance $h_0$ is around a hundred microns. The latter may be modified and hence the atoms transported along the y-axis by varying the parameters $I_{DC}$ or $B_0$.

Figure 3:
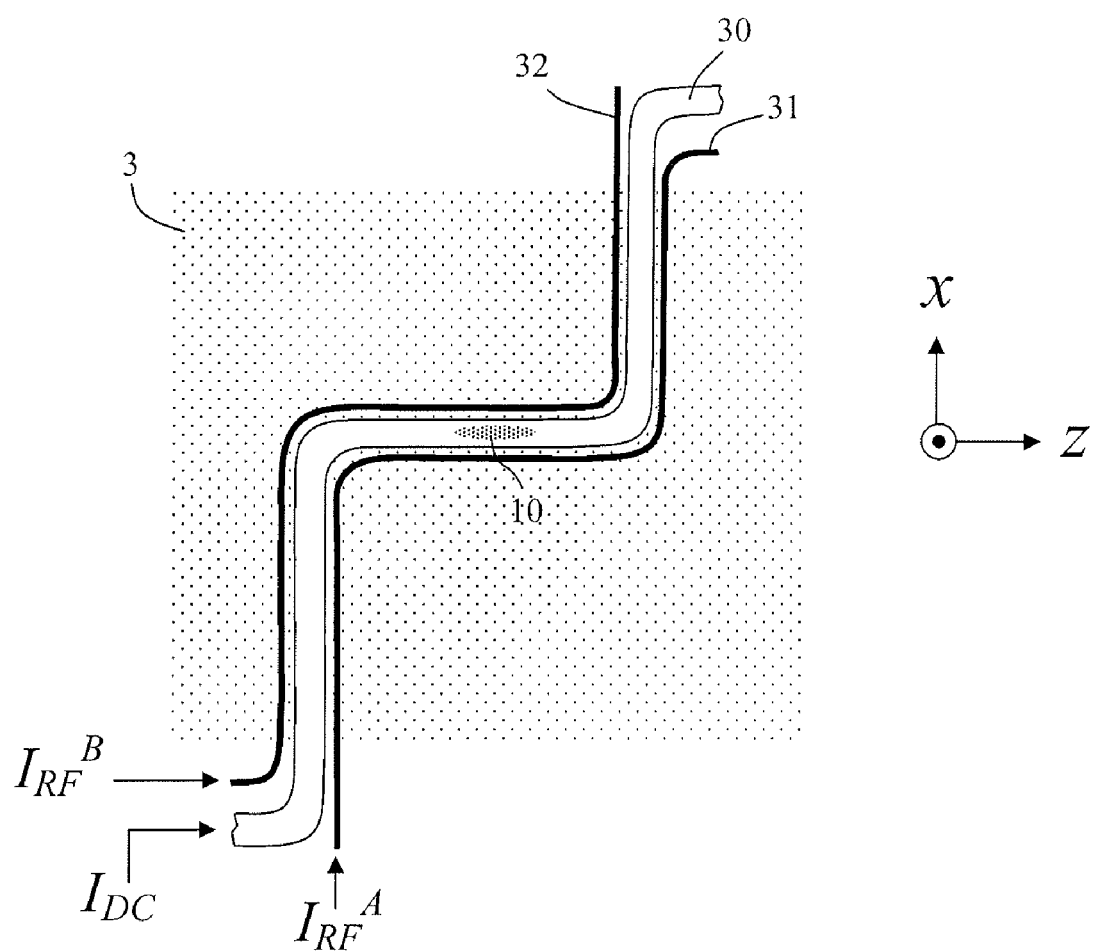
FIG. 3 shows a top view of the measurement plane of a first electronic chip for the rate gyro according to the invention comprising a single atom trap.
Figure 4:
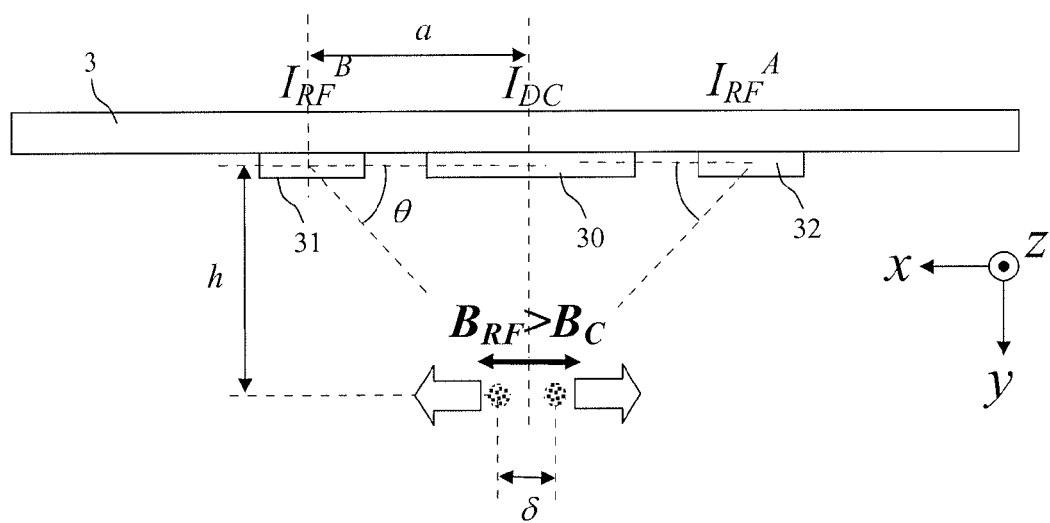
FIG. 4 shows a cross-sectional view of the measurement plane of an electronic chip for a sensor according to the invention comprising an atom trap allowing measurements of speed of rotation to be performed.
Figure 5A:
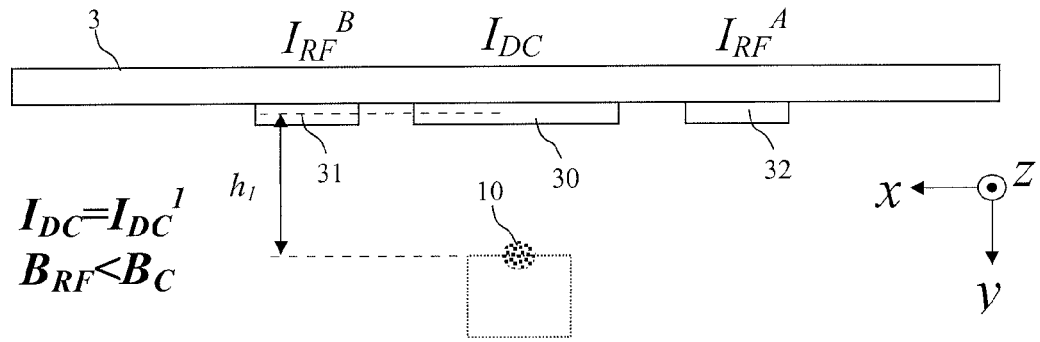
FIGS. 5a to 5e show the important steps of the method for measuring speed of rotation according to the invention.
Figure 5B:
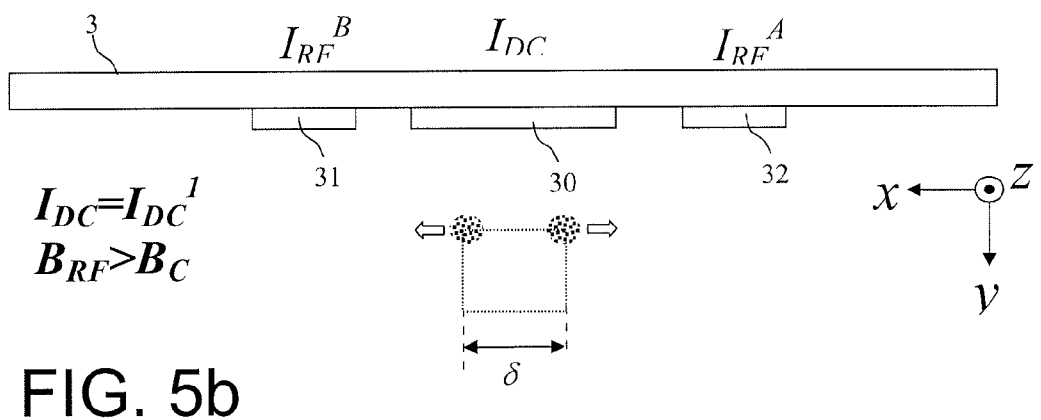
Figure 5C:
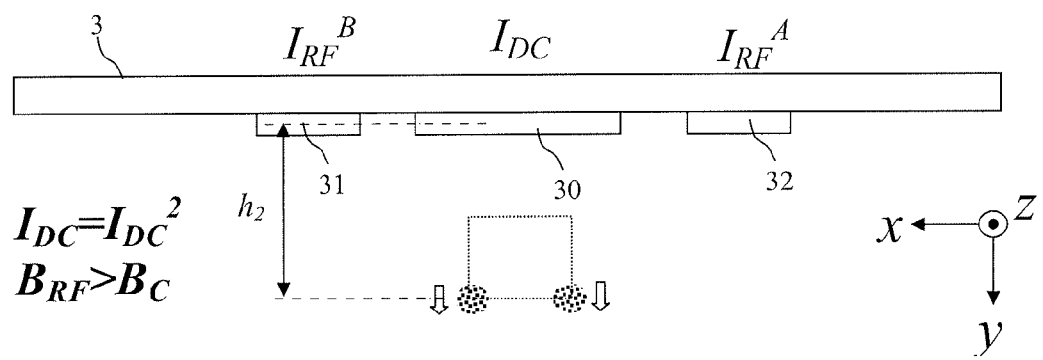
Figure 5D:
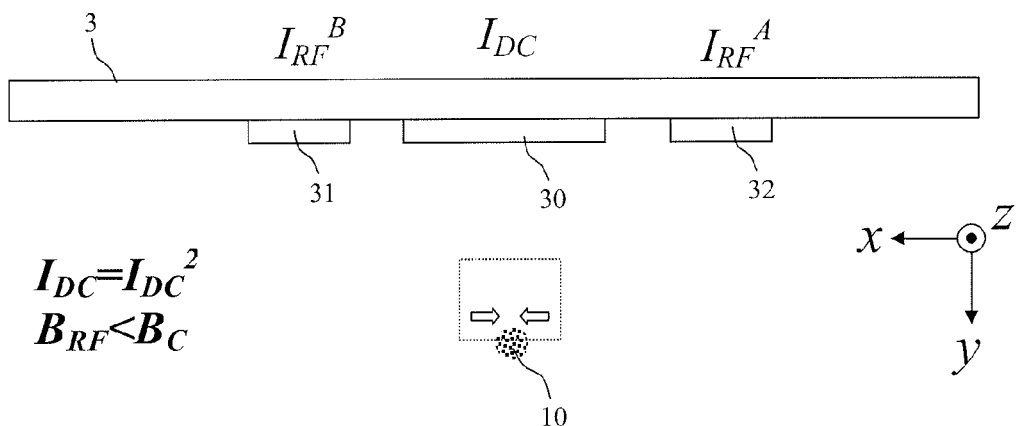
Figure 5E:
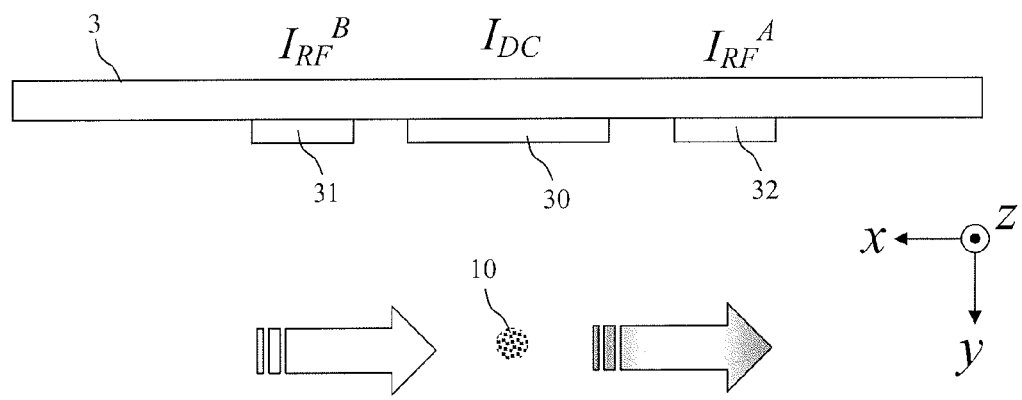

The device must also comprise means for separation of the atom cloud. Accordingly, in the device according to the invention, on either side of the main wire 30, two other wires 31 and 32, through which AC currents $I_{RF}^A$ and $I_{RF}^B$ flow, are disposed that are designed to generate a radiofrequency field for the coherent separation of the atoms. FIG. 3 shows a top view of this arrangement in which the central wire carrying a constant current is shown in white and the lateral wires, disposed symmetrically with respect to the central wire and carrying AC currents, are shown as black lines. It is also known that the application of a radiofrequency field allows the potential seen by the atoms to be modified, by inducing a coupling between magnetic sub-levels. Reference may be made to the publication by Lesanovsky et al., Adiabatic radiofrequency potentials for the coherent manipulation of matter waves, Physical Review A 73, 033619 (2006) on this subject More precisely, FIG. 4 shows the application of a radiofrequency field $B_{RF}$ polarized along the x-axis and generated toward the center of the atom trap, by for example applying in the radiofrequency wires 31 and 32 the following intensities:

$$I_{RF}^A = I_0 \cos(\omega_{RF} t) \text{ and } I_{RF}^B = I_0 \cos(\omega_{RF} t). \tag{B}$$

Denoting as a the distance separating a peripheral wire 31 or 32 from the central wire 30 and $\theta$ the angle such that $$tg(\theta) = \frac{h}{a},$$

the radiofrequency magnetic field seen by the atoms may then be expressed as a function of the geometrical parameters $\theta$ and a as follows:

$$B_{RF} = B_{RF}^0 \cos(\omega_{RF} t) \sin\theta e_x \text{ with } B_{RF}^0 = \frac{\mu_0 I_0 \cos\theta}{2\pi a}.$$

In the publication by Usanovsky, already cited, it is shown that when the value of $B_{RF}^0 \sin \theta$ is higher than a certain critical value $B_C$, this field causes a vertical separation of the atom cloud into two parts separated by the following distance $\delta$:

$$\delta = \frac{\sqrt{2}}{G} \sqrt{(B_{RF}^0 \sin\theta)^2 - B_C^2} \text{ with } G \approx \frac{B_0}{h}. \tag{C}$$

The parameter G is the gradient of the quadrupole field of the Ioffe trap. Again, according to the same reference, the critical radiofrequency field leading to the separation of the atom cloud into two parts is given by:

$$B_C = 2\sqrt{B_{0z} \frac{\kappa B_{0z} - \hbar\omega_{RF}}{|\kappa|}},$$

where $B_{0z}$ is the component of the constant magnetic field that needs to be applied along the z-axis in order to obtain a trap confining in the three dimensions and where the factor k is given by the expression $k = g_F \mu_B$, where $\mu_B$ is the Bohr magneton and $g_F$ the gyromagnetic factor, denoted g-factor, of the level in question. Of course, in order to effectively obtain a separation of the packet of atoms into two packets, the depth of the potential well along the y-axis must be greater than the difference in potential energy caused by gravity.

By means of these two tools, magnetic trapping of the atoms and separation by radiofrequency, it is then possible to split an atom cloud into two packets, to displace the packets in the two directions of the plane (O, x, y) in such a manner as to cause them to travel around a predetermined area, then to recombine them in order to reform a single atom cloud. This area is represented by a dashed rectangle in FIGS. 4, 5 and 6. All the conventional operations performed in an optical rate gyro can thus be carried out, in other words separation, propagation along a closed optical path then recombination of the two counter-rotating waves. In the same way, if the device is rotating about the axis Oz, a phase-shift is therefore observed between the two wave packets by the Sagnac effect. It is shown that the phase-shift $\Delta\varphi_{Sagnac}$ induced by the Sagnac effect between two counter-rotating packets of atoms in the presence of a rotation at the angular speed $\dot\theta$ may then be written:

$$\Delta\varphi_{Sagnac} = \frac{4Am}{\hbar}\dot\theta$$

More precisely, a first measurement method according to the invention comprises five main steps, illustrated in FIGS. 5a to 5e and detailed hereinbelow, the FIGS. 5a to 5e showing cross-sectional views in the plane (O, x, y) of the atom chip at the location of the atom trap; in these figures, the area traced out by the atoms is shown as a dashed line:

Step 1 (FIG. 5a): Capture and cooling of the atoms according to the conventional methods previously described, resulting in a cloud of cold atoms being obtained, advantageously a Bose-Einstein condensate, at the center of the magnetic trap, situated at a distance $h_1$, given by the equation (A), above the atom chip. The value of the constant current flowing in the central wire 30 is denoted $I_{DC}^1$;

Step 2 (FIG. 5b): Application progressive of a radiofrequency field according to the equation (B) by the conducting wires 31 and 32 carrying the currents $I_{RF}^A$ and $I_{RF}^B$, which leads to the adiabatic separation of the cloud of atoms by a distance δ along the x-axis, given by the equation (C);

Step 3 (FIG. 5c): Progressive increase of the DC current flowing in the central wire, up to a value $I_{DC}^2$, in the presence of the radiofrequency field previously established, the atoms moving along the y-axis to a distance $h_2$ from the chip;

Step 4 (FIG. 5d): Recombination phase, during which the radiofrequency field is progressively brought back below the critical separation value, while keeping the current flowing in the central wire at the constant value $I_{DC}^2$; the atoms are recombined;

Step 5 (FIG. 5e): Detection phase that may take place in situ or advantageously after a time-of-flight phase. The useful signal is formed by the phase of the atom density array formed on the gaseous cloud, and may be obtained, by way of example, by absorption imaging.

The sequence for variation of the various currents in the various conducting wires is summarized in the table hereinbelow:

|  | Phase 1 | Phase 2 | Phase 3 | Phase 4 |
| --- | --- | --- | --- | --- |
| $I_{DC}$ | $I_{DC}^1$ | $I_{DC}^1$ | $I_{DC}^1 \to I_{DC}^2$ | $I_{DC}^2$ |
| $I_{RF}^A$ | 0 | $0 \to I_0 \cos(\omega_{RF}t)$ | $I_0 \cos(\omega_{RF}t)$ | $I_0 \cos(\omega_{RF}t) \to 0$ |
| $I_{RF}^B$ | 0 | $0 \to I_0 \cos(\omega_{RF}t)$ | $I_0 \cos(\omega_{RF}t)$ | $I_0 \cos(\omega_{RF}t) \to 0$ |

It is shown that the phase-shift $\Delta\varphi_{Sagnac}$ induced by the Sagnac effect between two counter-rotating packets of atoms in the presence of a rotation at the angular speed $\dot\theta$ may then be written:

$$\Delta\varphi_{Sagnac} = \frac{4Am}{\hbar}\dot\theta \approx \frac{m\delta\mu_0(I_{DC}^2 - I_{DC}^1)}{2\pi\hbar B_0}\dot\theta.$$

It is this phase-shift, measured on the atom interference figure during step 5 of the sequence previously described, that provides information on the speed of rotation of the device.

However, this rate gyro presents a drawback. Owing to the spatial separation of the wave packet along the x-axis, the device thus formed will also be sensitive to the gravitation/acceleration field along this same axis (denoted $g_x$). The latter will in fact induce an additional phase-shift given by:

$$\Delta\varphi_{gravi} = \frac{mg_x}{\hbar}\delta T,$$

where T is the time during which the atom packets are separated, in other words the time between the start of phase 2 and the end of phase 4. In order to guarantee the correct operation of the device as a orolaser, it is essential to be able to determine the difference between the phase-shifts $\Delta\varphi_{Sagnac}$ and $\Delta\varphi_{gravi}$.

For this purpose, two technical solutions are possible. The first consists in minimizing the time taken for the phases 2, 3 and 4 of the sequence described hereinbelow, in order to guarantee the following condition over the whole range of use of the sensor: being equivalent to $$T \ll \frac{2\mu_0(I_{DC}^2 - I_{DC}^1)}{\pi B_0 g_y}\dot\theta.$$

Of course, if this solution is chosen, the choice of the value of T necessarily leads to the existence of a range of rotation around zero for which it will not be possible to distinguish a rotation from an acceleration in the y direction.

Figure 6:
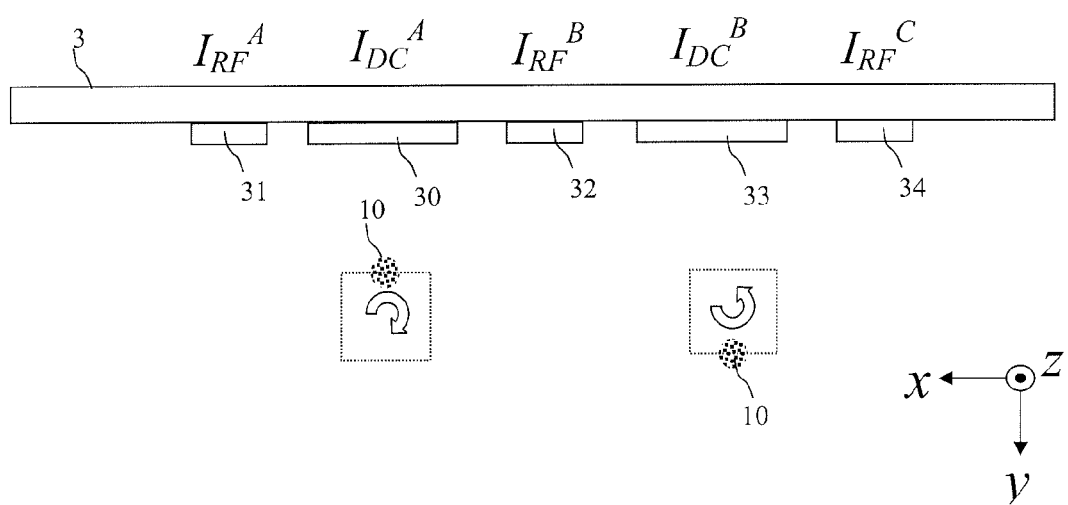
FIG. 6 shows a cross-sectional view of the measurement plane of an electronic chip for a sensor according to the invention comprising two atom traps allowing measurements of speed of rotation and of acceleration to be performed.

A second solution consists in using a sensor comprising two Sagnac interferometers as illustrated in FIG. 6, allowing both the speed of rotation and the acceleration to be determined. Each interferometer comprises an atom trap and separation, displacement and recombination means consisting of conducting wires configured as previously described. For reasons of efficiency, one of the conducting wires can be common to the two traps. The device then comprises five conducting wires, the end wires 31 and 34 and the central wire 32 carrying AC currents and providing the separation and recombination functions, the two other wires 30 and 33 providing the trapping and displacement functions for the atom clouds. In order to overcome noise effects, the areas traced out by the first and the second cloud are identical and followed in opposing directions. This effect is obtained by simultaneously driving the current flowing in the wire 30 from a first value $I_{DC}^1$ to a second value $I_{DC}^2$ and the current flowing in the wire 32 from a first value $I_{DC}^2$ to a second value $I_{DC}^1$, the inverse variations of the currents resulting in inverse variations in the path followed and inverse variations in the phase-shifts due to the rotation.

In this latter configuration, the measurement method also comprises five main steps which are very close to those detailed hereinabove. The sequence for variation of the various currents in the various conducting wires is thus summarized in the table hereinbelow:

|  | Phase 1 | Phase 2 | Phase 3 | Phase 4 |
|---|---|---|---|---|
| $I_{DC}^A$ | $I_{DC}^1$ | $I_{DC}^1$ | $I_{DC}^1 \to I_{DC}^2$ | $I_{DC}^2$ |
| $I_{DC}^B$ | $I_{DC}^2$ | $I_{DC}^2$ | $I_{DC}^2 \to I_{DC}^1$ | $I_{DC}^1$ |
| $I_{RF}^A$ | 0 | $0 \to I_0 \cos(\omega_{RF}t)$ | $I_0 \cos(\omega_{RF}t)$ | $I_0 \cos(\omega_{RF}t) \to 0$ |
| $I_{RF}^B$ | 0 | $0 \to I_0 \cos(\omega_{RF}t)$ | $I_0 \cos(\omega_{RF}t)$ | $I_0 \cos(\omega_{RF}t) \to 0$ |
| $I_{RF}^C$ | 0 | $0 \to I_0 \cos(\omega_{RF}t)$ | $I_0 \cos(\omega_{RF}t)$ | $I_0 \cos(\omega_{RF}t) \to 0$ |

The sum of the phase-shifts obtained is then a measurement of the acceleration in the x direction, whereas the difference between these phase-shifts is a measurement of the rotation about the z-axis. Such a configuration allows the two contributions to be clearly decoupled, while at the same time providing the two key functions of a inertial guidance system.

In summary, the main advantages of the device according to the invention are:
- a matter-wave rate gyro integrated onto an atom chip, with the possibility of installing several sensors in series on the same chip in order to reject the common-mode noise effects;
- with respect to the existing atom sensors, the invention allows coherent atom sources (Bose-Einstein condensates) to be used, thanks to the use of RF separators in place of Raman beams (gain in signal-to-noise ratio);
- the use of atom chips additionally allows gains in compactness, in integration and in electrical power consumption;
- the specific design presented in this invention can either be used solely as a rate gyro, or be coupled to a second interferometer which then provides the function of accelerometer while at the same time significantly enhancing the performance of the rate gyro;
- the combination of several embodiments of this invention along mutually orthogonal axes allows an atom inertial guidance system integrated onto a chip to be produced.

What is claimed is:

1. A rate gyro, of the matter-wave type, allowing the measurement of the speed of rotation along a given measurement axis, said rate gyro comprising at least:
    an electronic chip comprising a measurement plane;
    means for generating, capturing and cooling a cloud of ultracold atoms and an atom trap allowing the cloud of ultracold atoms to be immobilized at a predetermined distance from said measurement plane;
    the trap comprising, on the one hand, conducting wires integrated into said chip and, on the other hand, external means for generating a magnetic field resulting in a magnetic field local minimum;
    means for separating the atom cloud into two packets of atoms, means for displacing said packets, said means also allowing the two packets to be recombined into a single atom cloud, the whole of the two packets having traveled around a first closed area between the separation and recombination;
    means for optical measurement of the phase-shift introduced into the atom cloud after recombination;
    electronic means for monitoring, controlling and feedback control of the various means of the rate gyro;
    wherein the separation and displacement means essentially comprise a first main conducting wire a second conducting wire and a third conducting wire substantially parallel to one another within the region of the trap, the second conducting wire and the third conducting wire being disposed symmetrically on either side of the first wire, the second wire and the third wire carrying AC currents with the same amplitude and frequency flowing in the same direction, the maximum amplitude and the frequency of said currents being sufficient to create, within the atom cloud, an AC magnetic field with a higher intensity than the magnetic intensity required for the separation of the atom cloud into two packets of atoms along the axis of polarization of said field, the amplitude of the DC current $I_{DC}$ flowing in the first wire being able to be modified in the course of the measurement.

2. The rate gyro as claimed in claim 1, wherein the rate gyro comprises at least a second atom trap identical to the first atom trap, disposed above a second region of the measurement plane of the electronic chip and a fourth, a fifth and a sixth conducting wire having respective functions similar to those of the first, second and third conducting wires and arranged in such a manner as to separate a second atom cloud into two packets of atoms, to displace said packets and to recombine them into a single atom cloud, the whole of the two packets having traveled around a second closed area between the separation and recombination, the second area having either a direction of travel or geometrical properties different from the first area, the rate gyro also comprising means for optical measurement of the second phase-shift introduced into the second atom cloud after recombination, the electronic means comprising functions allowing at least the sum and the difference of the first and of the second phase-shifts to be performed.

3. The rate gyro as claimed in claim 1, wherein the means for cooling the cloud of ultracold atoms and the atom trap are designed in such a manner that the cloud or clouds of atoms are Bose-Einstein condensates.

4. A sensor, of the matter-wave type, for measuring the speed of rotation and the acceleration along a given axis and direction, said sensor comprising at least:
    an electronic chip comprising a measurement plane;
    means for generating, capturing and cooling at least a first and a second cloud of ultracold atoms;
    a first atom trap allowing the first cloud of ultracold atoms to be immobilized at a first predetermined distance from said measurement plane, and a second atom trap allowing the second cloud of ultracold atoms to be immobilized at a second predetermined distance from said measurement plane;
    the first trap comprising a first conducting wire integrated into said chip through which a first DC current $I_{DC}^A$ flows, the second trap comprising a fourth conducting wire integrated into said chip through which a current $I_{DC}^B$ flows, the first and the second trap comprising means for generating a uniform magnetic field whose field lines are parallel to the measurement plane and perpendicular to the direction of the first and of the fourth conducting wire;
    firsts means for separating the first atom cloud into two packets of atoms, first means for displacing said packets said means also allowing the two packets to be recombined into a single atom cloud, the whole of the two packets having traveled around a first closed area between the separation and recombination;

second means for separating the first atom cloud into two packets of atoms, second means for displacing said packets, said means also allowing the two packets to be recombined into a single atom cloud, the whole of the two packets having traveled around a second closed area between the separation and combination;

means for optical measurement of the first and of the second phase-shift introduced into the first and second atom clouds after recombination;

electronic means for monitoring, controlling and feedback control of the various means of the sensor;

wherein the first and second separation and displacement means essentially comprise the first and the fourth conducting wire, a second, a third and a fifth conducting wire substantially parallel to one another within the region of the trap, the second and the third conducting wires being disposed symmetrically on either side of the first wire the third and the fifth conducting wire being disposed symmetrically on either side of the fourth wire the second wire, the third wire and the fifth wire carrying AC currents with the same amplitude and frequency flowing in the same direction, the maximum amplitude and the frequency of said currents being sufficient to create, within the two atom clouds, an AC magnetic field with a higher intensity than the magnetic intensity required for the separation of the atom cloud into two packets of atoms in the direction of said magnetic field, the amplitudes of the DC currents $I_{DC}{}^A$ and $I_{DC}{}^B$ being able to be modified in the course of the measurement, the rate gyro comprising means for optical measurement of the first and second phase-shifts introduced into the first and the second atom clouds after recombination, the electronic means comprising functions allowing at least the sum and the difference of the first and the second phase-shifts to be performed.

5. The sensor as claimed in claim 4, wherein the direction of travel around the first area by the packets of atoms coming from the first cloud is opposite to that around the second area by the packets of atoms coming from the second cloud.

6. A method for measuring a speed of rotation about a given axis by means of a rate gyro, of the matter-wave type, said rate gyro comprising at least:

an electronic chip comprising a measurement plane;

means for generating, capturing and cooling a cloud of ultracold atoms and an atom trap allowing the cloud of ultracold atoms to be immobilized at a predetermined distance from said predetermined measurement plane;

the trap comprising at least, on the one hand, a first conducting wire integrated into said chip through which a DC current $I_{DC}$ flows and, on the other hand, means for generating a uniform magnetic field whose field lines, within the region of the trap, are parallel to the measurement plane and perpendicular to the direction of the first conducting wire;

means for separating the atom cloud into two packets of atoms, means for displacing said packets and for recombining the two packets into a single atom cloud, the separation and displacement means essentially comprising the first conducting wire a second conducting wire and a third conducting wire substantially parallel to one another within the region of the trap, the second conducting wire and the third conducting wire being disposed symmetrically on either side of the first wire, the second wire and the third wire carrying AC currents with the same amplitude and frequency flowing in the same direction, the maximum amplitude and the frequency of said currents being sufficient to create, within the atom cloud, an AC magnetic field with a higher intensity than the magnetic intensity required for the separation of the atom cloud into two packets of atoms along the axis of polarization of the field, the amplitude of the DC current $I_{DC}$ flowing in the first wire being able to be modified in the course of the measurement;

means for optical measurement of the phase-shift introduced into the atom cloud after recombination;

electronic means for monitoring, controlling and feedback control of the various means of the rate gyro;

wherein the performance of a measurement comprises the following phases:

Phase 1, called generation phase: Generation, cooling and trapping of a cloud of ultracold atoms at a first predetermined distance ($h_1$) from said measurement plane, the DC current $I_{Dc}{}^A$ having a first amplitude $I_{DC}{}^1$;

Phase 2, called separation phase: Progressive and simultaneous increase of the AC currents until the amplitude and the frequency of said currents are sufficiently high to create within the atom cloud a magnetic field with an intensity higher than the magnetic intensity required for the separation of the atom cloud into two packets, the two packets being separated by a given distance (δ) in a direction parallel to the measurement plane;

Phase 3, called displacement phase: Progressive variation of the amplitude of the DC current $I_{Dc}{}^A$ up to a second amplitude $I_{DC}{}^2$, the first distance of the packets of atoms varying up to a second predetermined distance ($h_2$) from said measurement plane;

Phase 4, called recombination phase: Lowering of the amplitude of the AC currents so as to regroup the two packets of atoms into a single phase-shifted atom cloud, the whole of the two packets having traveled around a first closed area between the separation and recombination;

Phase 5, called measurement phase: Measurement of the phase-shift by the optical measurement means.

7. The method for measuring the speed of rotation and the acceleration along a given axis and direction by means of a sensor, of the matter-wave type, said sensor comprising at least:

an electronic chip comprising a measurement plane;

means for generating, capturing and cooling at least a first and a second cloud of ultracold atoms;

a first atom trap allowing the first cloud of ultracold atoms to be immobilized at a first predetermined distance ($h_1$) from said measurement plane, a second atom trap allowing the second cloud of ultracold atoms to be immobilized at a second predetermined distance ($h_2$) from said measurement plane;

the first trap comprising a first conducting wire integrated into said chip through which a first DC current $I_{DC}{}^A$ flows, the second trap comprising a fourth conducting wire integrated into said chip through which a current $I_{DC}{}^B$ flows, the first and the second trap comprising means for generating a uniform magnetic field whose field lines are parallel to the measurement plane and perpendicular to the direction of the first and of the fourth conducting wire;

first means and second means for separation of the first and of the second atom cloud into two times two packets of atoms, first and second means for displacement of said packets, said means also allowing the four packets to be recombined into two atom clouds, all of the two times two packets having traveled around a first closed area between the separation and recombination and a second closed area between the separation and recombination, the first and second separation and displacement means essentially comprising the first and the fourth conducting wire a second, a third and a fifth conducting wire substantially parallel to one another within the region of the trap, the second and the third conducting wires being disposed symmetrically on either side of the first wire, the third and the fifth conducting wires being disposed symmetrically on either side of the fourth wire; the second wire, the third wire and the fifth wire carrying AC currents with the same amplitude and frequency flowing in the same direction, the maximum amplitude and the frequency of said currents being sufficient to create, within the two atom clouds, an AC magnetic field with a higher intensity than the magnetic intensity required for the separation of the two atom clouds into two times two packets of atoms, the amplitudes of the currents $I_{DC}^A$ and $I_{DC}^B$ being variable, the rate gyro comprising means for optical measurement of the first and of the second phase-shift introduced into the first and the second atom clouds after recombination, means for optical measurement of the first and of the second phase-shifts introduced into the first and second atom clouds after recombination;

electronic means for monitoring, controlling and feedback control of the various means of the sensor, comprising functions allowing at least the sum and the difference of the first and of the second phase-shifts to be performed;

wherein the performance of a measurement comprises the following phases:

Phase 1, called generation phase: Generation, cooling and trapping of a cloud of ultracold atoms at a first predetermined height above said measurement plane, the first DC current $I_{DC}^A$ having a first amplitude $I_{DC}^1$; generation, cooling and trapping of a second cloud of ultracold atoms at a second predetermined height above said measurement plane, the second DC current $I_{DC}^B$ having a first amplitude $I_{DC}^2$;

Phase 2 called separation phase: Progressive and simultaneous increase of the AC currents until the amplitude and the frequency of said currents are sufficiently high to create within the two atom clouds a magnetic field with an intensity higher than the magnetic intensity required for the separation of the two atom clouds into two times two packets, each set of two packets being separated by the same given distance in a direction parallel to the measurement plane;

Phase 3, called displacement phase: Progressive variation of the amplitude of the first DC current $I_{Dc}^A$ up to the second amplitude $I_{Dc}^2$, the first distance of the packets of atoms coming from the first cloud varying up to the second predetermined distance to said measurement plane, and progressive variation of the amplitude of the second DC current $I_{DC}^B$ up to the first amplitude $I_{DC}^1$, the second distance of the packets of atoms coming from the second cloud varying up to the first predetermined distance to said measurement plane;

Phase 4, called recombination phase: Lowering of the amplitude of the AC currents so as to regroup the two times two packets of atoms into two phase-shifted atom clouds, all of the packets having traveled around a first closed area and a second closed area between the separation and recombination;

Phase 5, called measurement phase: Measurement of the two phase-shifts obtained on the first cloud and the second cloud by the optical measurement means;

calculation of the sum and the difference of the first and of the second phase-shift.

8. The sensor as claimed in claim 4, wherein the means for cooling the cloud of ultracold atoms and the atom trap are designed in such a manner that the cloud or clouds of atoms are Bose-Einstein condensates.

* * * * *